(12) United States Patent
Liang et al.

(10) Patent No.: US 8,720,555 B2
(45) Date of Patent: May 13, 2014

(54) SELF-DIVERTING HIGH-RATE WATER PACKS

(75) Inventors: Feng Liang, Cypress, TX (US); Bradley L. Todd, Duncan, OK (US); Rajesh K. Saini, Cypress, TX (US); Stanley J. Heath, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 330 days.

(21) Appl. No.: 13/252,373

(22) Filed: Oct. 4, 2011

(65) Prior Publication Data

US 2012/0024526 A1 Feb. 2, 2012

Related U.S. Application Data

(63) Continuation-in-part of application No. 12/620,842, filed on Nov. 18, 2009, now Pat. No. 8,167,042.

(51) Int. Cl.
*E21B 43/25* (2006.01)
*E21B 43/267* (2006.01)
*C09K 8/80* (2006.01)

(52) U.S. Cl.
USPC .......... 166/280.2; 166/280.1; 166/281; 166/283; 166/297; 166/308.3; 507/219; 507/924

(58) Field of Classification Search
None
See application file for complete search history.

(56) References Cited

U.S. PATENT DOCUMENTS

| | | | |
|---|---|---|---|
| 4,670,501 A | 6/1987 | Dymond et al. | |
| 4,869,960 A * | 9/1989 | Gibb et al. | 428/405 |
| 5,249,627 A | 10/1993 | Harms et al. | |
| 5,833,000 A | 11/1998 | Weaver et al. | |
| 5,853,048 A | 12/1998 | Weaver et al. | |
| 6,439,309 B1 | 8/2002 | Matherly et al. | |
| 6,488,091 B1 | 12/2002 | Weaver et al. | |
| 6,817,414 B2 | 11/2004 | Lee | |
| 7,044,220 B2 | 5/2006 | Nguyen et al. | |
| 7,096,947 B2 | 8/2006 | Todd et al. | |
| 7,132,389 B2 | 11/2006 | Lee | |
| 7,482,309 B2 | 1/2009 | Ravi et al. | |
| 7,506,689 B2 | 3/2009 | Surjaatmadja et al. | |
| 7,645,725 B2 | 1/2010 | Weaver et al. | |
| 7,775,278 B2 | 8/2010 | Willberg et al. | |
| 8,016,040 B2 * | 9/2011 | Ali et al. | 166/281 |
| 2004/0231845 A1 | 11/2004 | Cooke, Jr. | |
| 2004/0261995 A1 | 12/2004 | Nguyen et al. | |
| 2005/0034861 A1 | 2/2005 | Saini et al. | |
| 2005/0205265 A1 | 9/2005 | Todd et al. | |
| 2005/0274517 A1 | 12/2005 | Blauch et al. | |
| 2005/0277554 A1 | 12/2005 | Blauch et al. | |
| 2006/0185847 A1 | 8/2006 | Saini et al. | |
| 2008/0296024 A1 * | 12/2008 | Huang et al. | 166/311 |
| 2009/0255668 A1 * | 10/2009 | Fleming et al. | 166/250.1 |
| 2009/0255686 A1 * | 10/2009 | Richard et al. | 166/376 |
| 2010/0200235 A1 | 8/2010 | Luo et al. | |
| 2010/0212906 A1 | 8/2010 | Fulton et al. | |
| 2011/0114312 A1 | 5/2011 | Todd | |
| 2011/0114313 A1 * | 5/2011 | Lesko et al. | 166/280.1 |
| 2013/0056204 A1 * | 3/2013 | McDaniel et al. | 166/280.1 |
| 2013/0081801 A1 | 4/2013 | Liang et al. | |
| 2013/0081813 A1 | 4/2013 | Liang et al. | |
| 2013/0081821 A1 | 4/2013 | Liang et al. | |

FOREIGN PATENT DOCUMENTS

| | | |
|---|---|---|
| GB | 2 448 629 A | 10/2008 |
| WO | 2011061497 A1 | 5/2011 |
| WO | 2013052291 A1 | 4/2013 |

OTHER PUBLICATIONS

International Search Report and Written Opinion for PCT/US2012/056601 dated Nov. 26, 2012.
Molner et al., "Factors Affecting the Properties of PLA/CaSo4 composites: Homogeneity and Interactions," Express Polymer Letters vol. 3, No. 1, (2009) 49-61.
International Search Report and Written Opinion for PCT/US2012/56335 dated Dec. 5, 2012.
U.S. Appl. No. 12/620,842, filed Nov. 18, 2009.

* cited by examiner

*Primary Examiner* — George Suchfield
(74) *Attorney, Agent, or Firm* — McDermott Will & Emery LLP; Holly Soehnge

(57) ABSTRACT

A method for diverting fluids across a perforation tunnel in high-rate water pack operations may include providing a wellbore extending into a subterranean formation, wherein a perforation tunnel provides a fluid connection between the wellbore and the subterranean formation; providing a diverting particulate that comprises a degradable plasticized polymer coating on a particulate; placing the diverting particulate into the perforation tunnel, wherein the step of placing the diverting particulate forms a particulate pack within the subterranean formation and the perforation tunnel; allowing the degradable plasticized polymer coating to deform and fill the interstitial spaces within the particulate pack in the perforation tunnel such that the fluid conductivity between the wellbore and the subterranean formation is substantially blocked; and allowing the plasticized polymer coating to degrade over time thereby substantially restoring the fluid conductivity between the wellbore and the subterranean formation.

20 Claims, 15 Drawing Sheets

SELF-DIVERTING HIGH-RATE WATER PACKS

CROSS REFERENCE TO RELATED APPLICATION

The present application is a continuation-in-part of U.S. patent application Ser. No. 12/620,842 filed on Nov. 18, 2009, the entire disclosure of which is incorporated herein by reference.

BACKGROUND

The present invention relates to self-diverting high-rate water packs of particulates that include a degradable plasticized polymer coating on a particulate.

Traditional operations that place gravel or proppant particulates into subterranean formations use viscosified fluids that are either gelled or gelled and crosslinked in order to increase the fluid's ability to carry suspended particulates. However, in recent years, water packs have become an increasingly popular alternative to conventional gelled slurry particulates packing methods. Water packs are particularly useful in situations wherein the gelled or crosslinked polymers could potentially damage formation permeability. Generally, a water-pack system uses non-viscosified brine as the carrier fluid for the gravel or proppant particulates. Rather than relying on viscosity as to carry particulates into perforation tunnels, water packs are used in situations (such as a shorter interval situation) where sufficient velocity can be generated to allow water to carry particulates into the perforation tunnels. Treatments use a blender that can continuously mix the particulates and carrier fluid and supply it to the downhole pump. As used herein, the term "perforation tunnels" refers to a communication tunnel from the casing or liner of a wellbore into a subterranean formation.

More recently, high-rate water packs have come into favor, particularly for use in longer perforated intervals and intervals that are deviated. High-rate water packs are placed at a rate/pressure that is at or near the fracture extension pressure of the reservoir. Placing gravel at such a rate allows for a pressure packing of the perforations and, generally, causes some perforation breakdown. In addition, high rate gravel packs allow for the use of water or a lightly gelled liquid to suspend and carry the gravel based on the flow rate rather than relying on high viscosity.

High-rate water packs are often used to fill perforations, to bypass near-wellbore damage, or to slightly extend fractures while simultaneously filling the fractures with particulates. One known problem in these operations is fluid loss into the formation of the low viscosity carrier fluid once the perforation or fracture has been filled. This is due, at least in part, to the fact that particulates offer relatively little resistance to fluid injection, even when completely filling a perforation tunnel or fracture. Because of the low viscosity nature of the water pack fluid, losses can be severe. Rapid leak off at filled perforations can lead to a risk of a node of particulates building up on the perforation entrance. Such nodes could build to the point of causing a bridge in the screen and screen out the treatment, thus ending the job prematurely. Preferably, once the perforation or fracture is filled, the fluid, and its remaining load of particulates, would divert to fill other perforations and fractures. As used herein "fluid loss" refers to the undesirable migration or loss of fluids (such as the fluid portion of a fracturing or particulate packing fluid) into a subterranean formation.

SUMMARY OF THE INVENTION

The present invention relates to self-diverting high-rate water packs of particulates that include a degradable plasticized polymer coating on a particulate.

In some embodiments, a method comprises: providing a wellbore extending into a subterranean formation, wherein a perforation tunnel provides a fluid connection between the wellbore and the subterranean formation; providing a diverting particulate that comprises a degradable plasticized polymer coating on a particulate; placing the diverting particulate into the perforation tunnel, wherein the step of placing the diverting particulate forms a particulate pack within the subterranean formation and the perforation tunnel; allowing the degradable plasticized polymer coating to deform and fill the interstitial spaces within the particulate pack in the perforation tunnel such that the fluid conductivity between the wellbore and the subterranean formation is substantially blocked; and allowing the plasticized polymer coating to degrade over time thereby substantially restoring the fluid conductivity between the wellbore and the subterranean formation.

In some embodiments, a method comprises: providing a wellbore extending into a subterranean formation, wherein a perforation tunnel provides a fluid connection between the wellbore and the subterranean formation; mixing a diverting particulate in a low-viscosity carrier fluid, wherein the diverting particulate comprises a degradable plasticized polymer coating on a particulate; introducing the diverting particulate and the low-viscosity carrier fluid into the wellbore via a high rate water pack operation; forming a particulate pack within the perforation tunnel; passing the low-viscosity carrier fluid through the particulate pack at a high rate thereby causing at least a portion of the degradable plasticized polymer coating to deform and fill the interstitial spaces within the particulate pack in the perforation tunnel such that the fluid connection between the wellbore and the subterranean formation is substantially blocked; and allowing the plasticized polymer coating to degrade over time thereby opening the interstitial spaces within the particulate pack to substantially restore the fluid connection between the wellbore and the subterranean formation.

In some embodiments, a method comprises: providing a wellbore extending into a subterranean formation, wherein a perforation tunnel provides a fluid connection between the wellbore and the subterranean formation; providing a diverting particulate in a low-viscosity carrier fluid, wherein the diverting particulate comprises a degradable plasticized polymer coating on a particulate; forming a particulate pack within the perforation tunnel; allowing the degradable plasticized polymer coating to deform and fill the interstitial spaces within the particulate pack in the perforation tunnel such that a differential pressure of at least about 500 psi can be maintained across the perforation tunnel; and allowing the plasticized polymer coating to degrade over time thereby opening the interstitial spaces within the particulate pack.

The features and advantages of the present invention will be readily apparent to those skilled in the art. While numerous changes may be made by those skilled in the art, such changes are within the spirit of the invention.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
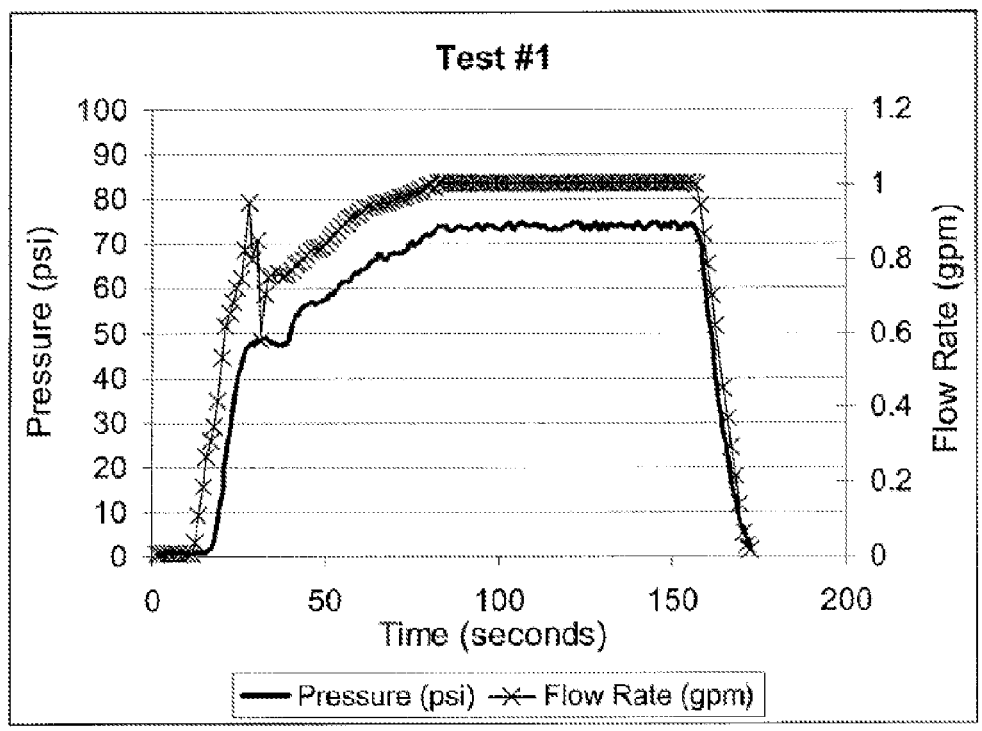
FIG. 1 shows the results of Test #1, sand coated with 0.75% tackifying agent and no degradable material.

The present invention relates to self-diverting high-rate water packs of particulates that include a degradable plasticized polymer coating on a particulate.

The term "High Rate Water Pack" or "HRWP," as used herein, refers to an operation in which particulates is injected into a cased and perforated well at a rate/pressure that are at or near the fracture rate/pressure of the reservoir. Placing particulates at such a rate allows for a pressure packing of the perforations and, generally, causes some perforation breakdown. In addition, high rate particulate packs allow for the use of water or a lightly gelled liquid to suspend and carry the particulate gravel based on the flow rate rather than through the use of a high viscosity carrier fluid. While the volume of gravel placed may vary, it is generally placed in an amount from about 40 to about 250 lbs/ft of interval treated. As used herein, per foot refers to as measured along the wellbore. Whereas a traditional particulate pack is pumped at a rate of about 2 to about 8 barrels per minute, high-rate water packs are generally pumped at a rate of about 5 to about 25 barrels per minute. HRWP's enhance particulate placement into the perforations and can obtain higher completion efficiencies than traditional water packs, which are pumped at lower rates. Often, placing HRWP's requires a blender that can continuously mix the particulates and water and supply it to a down hole pump at high rates.

One known method of determining the reservoir fracture rate/pressure involves performing a "step rate test." A step rate test involves pumping at successively higher rates (1 bbl/min, 2 bbl/min, 3 bbl/min, etc.) while monitoring the pressure on the portion of the subterranean formation being treated. When the data is analyzed (compensating for pipe friction and perforation friction) there will be seen a change in the slope of the plot of pressure versus rate. The rate corresponding to the change in slope is the fracture rate and the corresponding pressure is the fracture pressure. When a high-rate water pack is placed at rates above the fracture rate, they are sometimes referred to as "high-rate water fracs;" denoting the fact that such operations create or enhance fractures in the same operation as the placement of a particulate pack. Generally, high-rate water fracs are used to both fill the perforation tunnels and to pack the neighboring created or enhanced fractures.

The methods of the present invention provide self-diverting high-rate water packs comprising diverting particulates that reduce unwanted fluid loss and increase the likelihood of proper placement of the diverting particulates. As used herein, the term "diverting particulates" generally refers to particulates designed to divert fluid and/or particulates to other portions of a wellbore and/or subterranean formation. Generally, diverting particulates may include particulates coated with a tacky substance which itself may be used to adhere degradable fines to the particulate. Alternatively, diverting particulates may include particulates comprising a coating of a degradable plasticized polymer.

In some embodiments, the methods of the present invention use a low-viscosity carrier fluid to carry gravel. The gravel used in the methods of the present invention is coated with a tacky substance and wherein the tacky substance is used to adhere degradable fines to the gravel. As used herein, the term "coating," and the like, does not imply any particular degree of coating on the particulate. In particular, the terms "coat" or "coating" do not imply 100% coverage by the coating on the particulate. In the methods of the present invention, the "tackiness" of the tacky substance is tailored such that the degradable fines stay substantially adhered to the gravel until they are placed into a desired location within a subterranean formation. As used herein, the term "tacky," in all of its forms, generally refers to a substance having a nature such that it is (or may be activated to become) somewhat sticky to the touch. The term "low-viscosity carrier fluid," as used herein, refers to a fluid having a viscosity of less than about 20 cp, preferably less than about 10 cp. By way of example, a solution of 10 pounds of guar in 1000 gallons of water solution is a typical low-viscosity carrier fluid. As used herein, the term "degradable fines" refers to solid, particulate material that is smaller in size than the gravel it is adhered to and that is capable of substantially degrading over time in the subterranean environment into which they are placed.

When a high-rate water pack is placed, the gravel is subjected to a known amount of shear during the process of blending the gravel into the low-viscosity carrier fluid and during the process of placing the low-viscosity carrier fluid and gravel into a wellbore and down to a desired portion of a subterranean formation. While centrifugal pumps may be used to mix gravel into a low-viscosity carrier fluid for high-rate water pack operations, the methods of the present invention relating to said gravel preferably employ pumps that introduce less shearing effect, such as positive displacement pumps. However, nearly any pump and any blending operation can be employed due to the fact that the degradable particles tend to adhere back to the surface of the gravel during the journey through the wellbore to the area to be treated due to the action of the tacky substance. Once the gravel reaches a location through which it is too large to pass (such as the end of a perforation or fracture or a choke point within a fracture), the gravel stops moving and begins to fill from the outermost point from the wellbore back toward the wellbore. One skilled in the art will recognize that the gravel need not reach the outermost point of a fracture or perforation and that the conditions discussed below may also occur if the gravel bridges across such a space before reaching the outermost point.

Once gravel stoppage and filling begins to occur, the stopped gravel is subjected to significantly higher fluid velocities that it was when it was traveling as part of the fluid. At this point, fluid rushing past the gravel is being lost into the formation, a generally undesirable occurrence. However, according to the methods of the present invention, at this time the degradable fines are subjected to such high velocities (such as in packed perforation tunnels) that the tacky substance is no longer sufficient to adhere the fines to the gravel surface and the fines thus begin to break free from the surface of the gravel. The degradable fines, which are preferably sized to effectively block up the interstitial spaces between neighboring pieces of gravel within the gravel pack, are then carried with the carrier fluid until they become lodged between neighboring pieces of gravel or between the gravel and the subterranean formation. Thus, rather than allowing continued fluid loss, the portion of the subterranean formation, which is now packed with gravel, fills with gravel and degradable fines so as to reduce or stop fluid loss. The remaining carrier fluid and gravel is thus diverted to other areas of the subterranean formation where flow continues—such as other perforations or fractures not yet filled with gravel. Over time, the degradable fluid loss material degrades in the subterranean formation, thus restoring permeability and leaving behind a gravel-packed area.

Considering the theoretical velocity change once gravel stoppage occurs, if about 200 pounds of gravel are being placed outside of the casing per foot of interval treated, Table 1 shows the calculated velocity contrast at the formation face outside of the casing compared to the velocity in the perforation tunnels. The data in Table 1 are based on the assumption that the volume of the flow area is cylindrical (a conservative assessment since the volume is probably not a cylinder and more in the form of parted plains). Thus, as seen in Table 1, based on the assumptions above, the ratio of the specific velocity in the perforation tunnel compared to the specific velocity at the wall of the cylinder would be about 84 to 1. Also, as seen in Table 1, increasing the formation area greatly increases the disparity between the specific velocity at the wall of the cylinder to the velocity in the perforation tunnels.

TABLE 1

Determination of Ratios of Flow Areas

| | | |
|---|---|---|
| Formation initial internal diameter | 8.5 | inches |
| Proppant behind the casing | 200 | lbs/ft of interval treated |
| Volume of proppant behind the casing | 2 | cubic feet |
| Perforation internal diameter | 1 | inches |
| Number of perforations per square foot | 12 | |
| Perforation area | 0.06545 | square feet |
| Cylindrical Shape | | |
| New formation internal diameter | 1.745914 | feet |
| Formation flow area | 5.48495 | square feet |
| Ratio of formation area to perforation 6" wide fracture | 83.80387 | |
| Length from tip to tip | 4 | feet |
| Folination flow area | 8.5 | square feet |
| Ratio of formation area to perforation 2" wide fracture | 129.8704 | |
| Length from tip to tip | 12 | feet |
| Formation flow area | 24.16667 | square feet |
| Ratio of formation area to perforation | 369.2395 | |

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In alternative embodiments, a particulate may comprise a degradable plasticized polymer coating on said particulate. In some embodiments, a degradable plasticized polymer may comprise a degradable polymer and a plasticizer. In some embodiments, a degradable plasticized polymer coated particulate may be present in a low-viscosity carrier fluid in an amount ranging from a lower limit of about 40, 50, 70 or 100 lbs/ft of perforation to an upper limit of about 250, 200, 150, or 100 lbs/ft of perforation, and wherein the amount of degradable plasticized polymer coated particulate may range from any lower limit to any upper limit and encompass any subset between the upper and lower limits.

In some embodiments, a degradable plasticized polymer coating may be able to deform. As used herein, the term "deform," and derivatives thereof, includes plastic and elastic deformation. In some embodiments, deformation can be caused by passing low-viscosity carrier fluid at a high-rate through a particulate pack comprising the degradable plasticized polymer coated particulates wherein the high-rate may range from a lower limit of about 0.5 gal/min, 1 gal/min, or 2 gal/min to an upper limit of about 5 gal/min, 4 gal/min, or 3 gal/min, and wherein the high-rate may range from any lower limit to any upper limit and encompass any subset between the upper and lower limits.

In some embodiments when a particulate is in a particulate pack, deformation of the degradable plasticized polymer coating on the particulate may be to the extent that the degradable plasticized polymer fills at least some interstitial spaces between the particulates. In some embodiments, deformation of the degradable plasticized polymer coating may cause fluid conductivity through a particulate pack to be at least partially reduced or substantially blocked. In some embodiments, the degradable plasticized polymer may degrade and open at least some of the interstitial spaces of the particulate pack. In some embodiments, the degradable plasticized polymer may degrade thereby at least partially, or substantially, restoring fluid conductivity through the particulate pack.

In some embodiments, a diverting particulate of the present invention, be it a particulate coated with a tackifier plus degradable fines or a degradable plasticized polymer, may be a component of a particulate pack capable of maintaining a differential pressure across the particulate pack of at least 500 psi. In some embodiments, the particulate pack may be able to maintain a differential pressure of 500 psi for at least 2 hours. In some embodiments, the particulate pack may be able to maintain a differential pressure of 500 psi for at least 6 hours. In some embodiments, the degradable fines or degradable plasticized polymer may degrade such that the particulate pack maintains a differential pressure of less than about 100 psi. Testing of the differential pressure a diverting particulate of the present invention is capable of maintaining may be achieved in accordance with the tests performed in Tests #11-#14 as described herein in the Examples Section.

In some embodiments, a diverting particulate of the present invention, be it a particulate coated with a tackifier plus degradable fines or a degradable plasticized polymer, may be placed in a desired location within a wellbore and/or subterranean formation including, but not limited to, in a perforation tunnel, in a fracture (natural or man-made), between the annulus of a wellbore and a screen, and any combination thereof.

Figure 11:
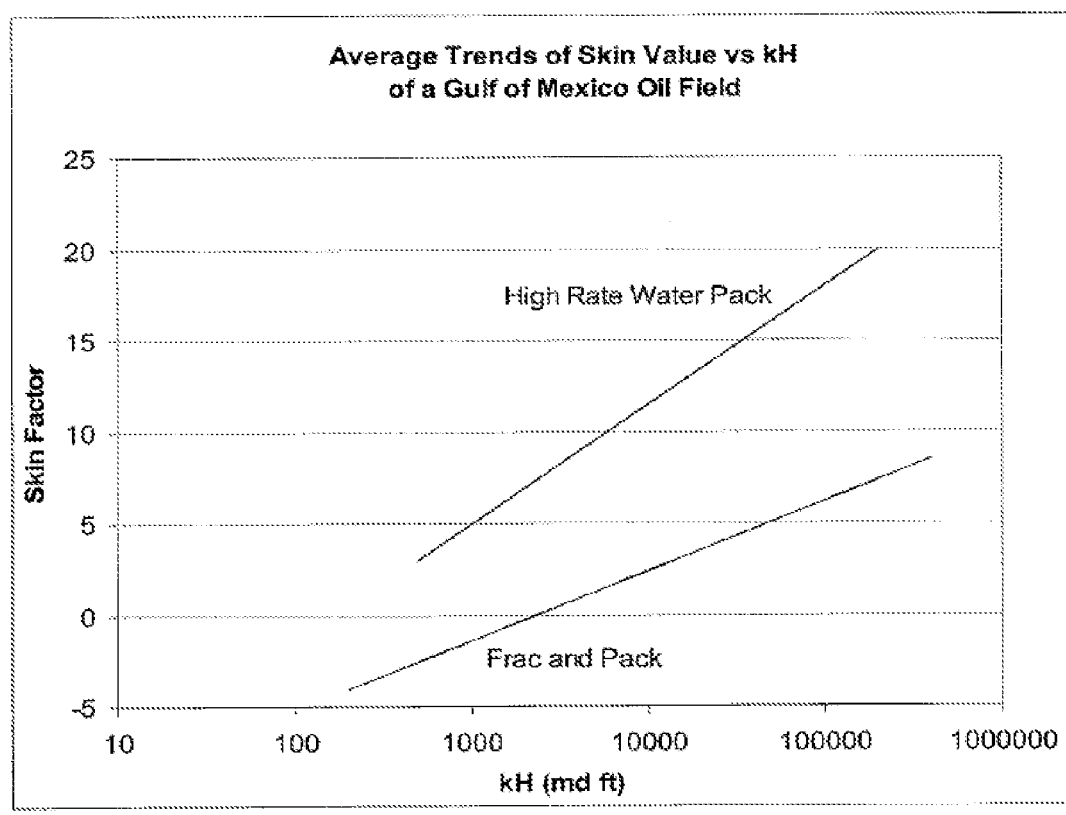
FIG. 11 illustrates a summary of case histories comparing skin values for fracpac treatments versus high-rate water pack treatment.

The methods of the present invention may be particularly well-suited for use in completion operations in deviated wells over 100 feet in length; particularly for those longer wells that are cased-and-perforated in relatively soft sandstone formations. Long, highly deviated wells are generally poor candidates for fracpac treatments (those treatments that combine a fracturing operation with a gravel packing operation) due, at least in part to wellbore/fracture alignment issues. Moreover, such long, deviated wells are generally not long enough to be tolerant to near-wellbore damage; thus, high-rate water packs have been a completion technique used in these type wells in an attempt to get at least partial breakdown of the perforation tunnels along the interval without growing a single fracture that would take most of the treatment and be poorly connected to the wellbore. However, while high-rate water packs have met with some success, given the case histories, there is much room for further improvement. A summary of case histories comparing skin values for fracpac treatments versus high-rate water pack treatments is shown in FIG. 11. The term "skin value" refers to a dimensionless factor calculated to determine the production efficiency of a well by comparing actual conditions with theoretical or ideal conditions. A positive skin value indicates some damage or influences that are impairing well productivity. A negative skin value indicates enhanced productivity, such as the enhancement resulting from stimulation. The methods of the present invention are designed to increase the percentage of the zone being treated by self-diverting the particulates and carrier fluid once a portion of a wellbore and/or subterranean formation (such as a perforation tunnel) has been treated and packed. As used herein, the term "deviated wellbore" refers to a wellbore that is at least about 30 to 60 degrees off-vertical (wherein 90-degrees off-vertical corresponds to a fully horizontal wellbore). As used herein, the term "highly deviated wellbore" refers to a wellbore that is at least about 60 to 90 degrees off-vertical (wherein 90-degrees off-vertical corresponds to fully a horizontal wellbore).

Where the methods of the present invention are used as a part of a high-rate water frac operation, such an operation may act to either create new fractures within the formation, enhance existing fractions, or both. As used herein, "enhancing" one or more fractures includes the extension or enlargement of one or more natural or previously created fractures in the subterranean formation. It should be noted that in the embodiments present herein high rate fracpac may be substituted for high-rate water frac, unless otherwise specified.

Some embodiments may include mixing a diverting particulate with a low-viscosity carrier fluid. Some embodiments may include introducing the diverting particulate and a low-viscosity carrier fluid into a wellbore penetrating a subterranean formation via a high rate water pack or a high-rate water frac operation.

Low-viscosity carrier fluids suitable for use in the present invention generally comprise an aqueous fluid that has a viscosity of less than about 20 cp, preferably less than about 10 cp. Suitable fluids include fresh water, salt water, brine, sea water, and any other aqueous liquid that does not adversely react with the other components in the treatment or with the subterranean formation. The fluid may further comprise gelling agents, as long as the overall viscosity of the fluid stays within the acceptable range noted above. Any viscosifying agent known in the art may be employed, including hydratable polymers that contain one or more functional groups such as hydroxyl, carboxyl, sulfate, sulfonate, amino, or amide groups. Suitable gelling typically comprises polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, diutan, and combinations thereof. In certain embodiments, the gelling agents comprise an organic carboxylated polymer, such as CMHPG. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference.

In embodiments wherein the low-viscosity carrier fluid includes the use of gelling agents, they may also include internal delayed gel breakers such as enzyme, oxidizing, acid buffer, or temperature-activated gel breakers. The gel breakers cause the viscous carrier fluids to revert to thin fluids that can be produced back to the surface after they have been used. When used, a gel breaker is typically present in the carrier fluid in an amount in the range of from about 0.5% to about 10% by weight of the gelling agent. The low-viscosity carrier fluids may also include one or more of a variety of well-known additives, such as gel stabilizers, fluid loss control additives, clay stabilizers, bactericides, and the like.

Particulates suitable for use in the present invention, as gravel particulates, proppant particulates, or otherwise, may be comprised of any material suitable for use in subterranean operations. Suitable particulate materials include, but are not limited to, sand; bauxite; ceramic materials; glass materials; polymer materials; polytetrafluoroethylene materials (commonly sold under the brand name Teflon®); nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Composite particulates may also be suitable. Suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. One of skill in the art will recognize that the distinction between "gravel" and "proppant" is related to the way the material is used, rather than the composition of the material itself. Typically, the particulates have a size in the range of from about 2 to about 500 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "gravel," as used in this disclosure, includes all known shapes of materials including substantially spherical materials, fibrous materials, polygonal materials (such as cubic materials), and mixtures thereof.

Degradable materials suitable for use in the present invention, as at least a portion of a degradable fine or a degradable plasticized polymer coating, include, but are not limited to, degradable polymers, dehydrated compounds, and mixtures thereof. Such degradable materials are capable of undergoing an irreversible degradation downhole. The term "irreversible" as used herein means that the degradable material, once degraded downhole, should not recrystallize or reconsolidate, e.g., the degradable material should degrade in situ but should not recrystallize or reconsolidate in situ. Suitable examples of degradable polymers that may be used in accordance with the present invention include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(ε-caprolactone); poly(hydroxybutyrate); poly(anhydrides); aliphatic polycarbonates; poly(ortho ethers); poly (amino acids); poly(ethylene oxide); poly(ether ester), poly (ether amide); polyurethanes, polyacetals; poly carbonates; polyamides; polyacrylates; polyphosphazenes; any derivative thereof; any copolymer thereof; and any combination thereof. Polyanhydrides are another type of particularly suitable degradable polymer useful in the present invention. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride). One skilled in the art will recognize that plasticizers may be included in forming suitable polymeric degradable materials of the present invention. The plasticizers may be present in an amount sufficient to provide the desired characteristics, for example, plasticizers may increase the likelihood of an effective mixture of the melt blend components, may improve processing characteristics during the blending and processing steps, and may control and regulate the sensitivity and degradation of the polymer by moisture.

Suitable dehydrated compounds that may be used as at least a portion of a degradable fine or a degradable plasticized polymer coating are those materials that will degrade over time when rehydrated including, but not limited to, borate materials, calcium carbonate, and any combination thereof. For example, a particulate solid dehydrated salt or a particulate solid anhydrous borate material that degrades over time may be suitable. Specific examples of particulate solid anhydrous borate materials that may be used include, but are not limited to, anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid.

In addition, blends of certain degradable materials and other compounds, like dehydrated compounds, may also be suitable for use in the present invention. One example of a suitable blend of materials is a mixture of poly(lactic acid) and sodium borate where the mixing of an acid and base could result in a neutral solution where this is desirable. Another example would include a blend of poly(lactic acid) and boric oxide. In choosing the appropriate degradable material or materials, one should consider the degradation products that will result. The degradation products should not adversely affect subterranean operations or components. The choice of degradable material also can depend, at least in part, on the conditions of the well, e.g., wellbore temperature. For instance, lactides have been found to be suitable for lower temperature wells, including those within the range of 60° F. to 150° F., and polylactide have been found to be suitable for wellbore temperatures above this range. Poly(lactic acid) and dehydrated salts may be suitable for higher temperature wells. Also, in some embodiments a preferable result is achieved if the degradable material degrades slowly over time as opposed to instantaneously. In some embodiments, it may be desirable when the degradable material does not substantially degrade until after the degradable material has been substantially placed in a desired location within a subterranean formation. One skilled in the art, with the benefit of this disclosure will be able to select an appropriate material to use for the degradable fines.

Suitable plasticizers that may be included in the degradable plasticized polymer coating include, but are not limited to, polyols such as glycerol, propylene glycol and polyethylene glycol (PEG); diacetyl monoacyl glycerol; polypropylene glycol (and epoxy derivatives thereof); polyethylene oxide; oligomeric lactic acid and derivatives thereof; organic esters such as citrate esters, e.g., tributyl citrate oligomers, triethyl citrate, acetyltributyl citrate, acetyltriethyl citrate, trioctyl citrate, acetyl trioctyl citrate, trihexyl citrate, acetyl trihexyl citrate and trimethyl citrate; 1,2-cyclohexane dicarboxylic acid diisononyl ester; alkyl sulfonic acid phenyl ester; glucose monoesters; partially fatty acid esters; PEG monolaurate; acetic esters including triacetin; poly(ε-caprolactone); poly(hydroxybutyrate); glycerin-1-benzoate-2,3-dilaurate; glycerin-2-benzoate-1,3-dilaurate; ethylphthalylethyl glycolate; glycerine diacetate monocaprylate; poly(propylene glycol) dibenzoate, dipropylene glycol dibenzoate; ethyl phthalyl ethyl glycolate; poly(ethylene adipate) disterate; adipate-based plasticizers such as di-iso-butyl adipate and bis(butyl diethylene glycol)adipate; any derivative thereof; and any combination thereof. One or more plasticizers may be added, as combinations may increase the efficacy of the desired result.

In some embodiments, the amount of plasticizer in the degradable plasticized polymer composition may range from a lower limit of about 0.1%, 1%, 5%, 10%, or 25% to an upper limit of about 50%, 40%, or 25%, and wherein the amount of plasticizer in the degradable plasticized polymer may range from any lower limit to any upper limit and encompass any subset between the upper and lower limits. In some embodiments, the amount of plasticizer in the degradable plasticized polymer composition may be such that the glass transition temperature of the plasticized polymer may be lower than the corresponding unplasticized polymer by an amount ranging from a lower limit of about 5° C., 10° C., 15° C., or 20° C., to an upper limit of about 50° C., 40° C., 30° C., or 20° C., and wherein the glass transition temperature of the plasticized polymer may be lower than the corresponding unplasticized polymer by an amount ranging from any lower limit to any upper limit and encompass any subset between the upper and lower limits.

With respect to the degradable plasticized polymer coating, in addition to the selection of the material, the thickness of the coating should also be correctly sized for the methods of the present invention. Suitable coating thickness may range from a lower limit of about 0.5 microns, 1 micron, 5 microns, or 10 microns to an upper limit of about 50 microns, 25 microns, or 10 microns, and wherein the thickness may range from any lower limit to any upper limit and encompass any subset between the upper and lower limits. It should be understood that as the coatings include partial coatings of a particulate, the range provided is for the average thickness where coating is present.

With respect to the degradable fines, in addition to the selection of the material, fines must also be correctly sized for the methods of the present invention. Preferably, the degradable fine size is selected such that, when mobilized, the fines are capable of at least partially blocking the pore spaces left between neighboring pieces of gravel. The fines should thus be sized based on the size and sphericity of the selected gravel and the type of packing. By type of packing, for example, sand allowed to naturally settle in the bottom of a vessel might result in relatively loose, random packing whereas particles that are vibrated after forming a pack will result in tighter, more ordered packing. Examples of ordered packing include hexagonal close pack, and face centered cubic. In general however, in each type of packing there will result somewhere in the pack a pore throat shaped from three tangent particles. This type pore throat is the smallest possible with rigid particles. Degradable fines used in the present invention are sized so as to be larger than such pore throats so that they are capable of bridging the pore throat and forming a blockage. In more ordered, dense pack, the pore throat will be smaller and the degradable fine will be able to more easily block up the pack; however, even in loosely packed beds blockage will occur over time. In the case of a gravel pack formed in perforation tunnels, the magnitude of flow forces on the gravel pack will likely result in a relatively ordered, dense pack. By way of example, the median pore throat diameter of 20/40 gravel pack sand is about 100 microns. Also, one of skill in the art will recognize that when sphericity drops, there will be a tendency of protruding parts of the particle to reduce the pore throat size from three tangent particles; thus, calculations based on an assumption of perfect spheres provides the most conservative estimate of particle bridging (requiring larger degradable fines to achieve blockage). In addition to particle size and sphericity, rigidity of the degradable fines themselves may also effect the selection of the degradable fine size. By way of example, flexible degradable fines may require a fine size up to about 150% of the pore throat size.

The degradable fines are adhered onto the surface of the gravel using a tackifying agent. In some embodiments, a diverting particulate of the present invention, be it a particulate coated with a tackifier plus degradable fines or a degradable plasticized polymer, may comprise a tackifying agent. Tackifying agents suitable for use in the present invention include non-aqueous tackifying agents; aqueous tackifying agents; and silyl-modified polyamides. Unlike resins, tackifying agents do not harden to more solid masses. Rather they provide an elasticity to the connection between two solid particles such that they may be adhered to one another and then pulled apart when placed under stress. As noted above, the method of the present invention uses tackifying agents to temporarily adhere degradable fines to the surface of gravel such that they are released once placed under greater stress (such as the increase in frictional stress caused when the gravel particles become lodged into a portion of a formation while the low viscosity carrier fluid continues to flow around them).

One type of preferred tackifying agent comprises non-aqueous tackifying agents; polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of C36 dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac and the like. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Solvents suitable for use with the non-aqueous tackifying agents of the present invention include any solvent that is compatible with the non-aqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Aqueous tackifying agents suitable for use in the present invention are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass.

Suitable aqueous tackifying agents include any polymer that can bind, coagulate, or flocculate a particulate. Also, polymers that function as pressure sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methylpropane sulfonate co-polymers; and acrylic acid/acrylamido-methyl-propane sulfonate copolymers, derivatives thereof, and combinations thereof. The term "derivative" as used herein refers to any compound that is made from one of the listed compounds, for example, by replacing one atom in the base compound with another atom or group of atoms. Methods of determining suitable aqueous tackifying agents and additional disclosure on aqueous tackifying agents can be found in Published U.S. Patent Application Number 2005-0277554 and Published U.S. Patent Application Number 2005-0274517, the relevant disclosures of which are hereby incorporated by reference.

Some suitable aqueous tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% CI-30 alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl (meth)acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

Silyl-modified polyamide compounds suitable for use as tackifying agents in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

According to the methods of the present invention, gravel is at least partially coated with a tackifying agent and then degradable fines are adhered to the surface of the gravel, held in place due to the action of the tackifying agent. The gravel, having tackifying agents and degradable fines thereon is then suspended in a low-viscosity carrier fluid and placed into a desired location within a subterranean formation. In preferred embodiments, the gravel is suspended in the low-viscosity carrier fluid using a blender that can continuously mix the coated gravel and the aqueous fluid and supply it to the downhole pump at high rates. In some embodiments, high-rate water packs placed according to the methods of the present invention are generally pumped at from about 5 to about 25 barrels per minute, preferably from about 10 to about 25 barrels per minute, and more preferably from about 15 to about 20 barrels per minute.

In some embodiments, the low-viscosity carrier fluid may further comprise an additive selected from the group consisting of a salt; a weighting agent; an inert solid; a fluid loss control agent; an emulsifier; a dispersion aid; a corrosion inhibitor; an emulsion thinner; an emulsion thickener; a viscosifying agent; a high-pressure, high-temperature emulsifier-filtration control agent; a surfactant; a second particulate; a proppant; a lost circulation material; a foaming agent; a gas; a pH control additive; a breaker; a biocide; a crosslinker; a stabilizer; a chelating agent; a scale inhibitor; a mutual solvent; an oxidizer; a reducer; a friction reducer; a clay stabilizing agent; and any combination thereof.

In some embodiments, a perforation tunnel provides a fluid connection between a wellbore and a subterranean formation. Placing a diverting particulate, which includes at least a degradable plasticized polymer coating on a particulate, into the perforation tunnel may form a particulate pack within the subterranean formation and the perforation tunnel. Allowing the degradable plasticized polymer coating to deform may fill the interstitial spaces within the particulate pack in the perforation tunnel may cause the fluid conductivity between the wellbore and the subterranean formation is substantially blocked. Allowing the plasticized polymer coating to degrade over time may substantially restore the fluid conductivity between the wellbore and the subterranean formation.

In some embodiments, a perforation tunnel provides a fluid connection between a wellbore and a subterranean formation. Introducing the diverting particulate, which includes at least a degradable plasticized polymer coating on a particulate, and the low-viscosity carrier fluid into the wellbore via a high rate water pack operation may generally allow for forming a particulate pack within the perforation tunnel. Passing the low-viscosity carrier fluid through the particulate pack at a high rate may cause at least a portion of the degradable plasticized polymer coating to deform and fill the interstitial spaces within the particulate pack in the perforation tunnel such that the fluid connection between the wellbore and the subterranean formation is substantially blocked. Allowing the plasticized polymer coating to degrade over time may open the interstitial spaces within the particulate pack to substantially restore the fluid connection between the wellbore and the subterranean formation.

In some embodiments, a perforation tunnel provides a fluid connection between a wellbore and a subterranean formation. Introducing the diverting particulate, which includes at least a degradable plasticized polymer coating on a particulate, and the low-viscosity carrier fluid into the wellbore via a high rate water pack operation may generally allow for forming a particulate pack within the perforation tunnel. The degradable plasticized polymer coating may deform and fill the interstitial spaces within the particulate pack in the perforation tunnel such that a differential pressure of at least about 500 psi can be maintained across the perforation tunnel. Allowing the plasticized polymer coating to degrade over time may open the interstitial spaces within the particulate pack.

To facilitate a better understanding of the present invention, the following examples of preferred embodiments are given. In no way should the following examples be read to limit, or to define, the scope of the invention.

EXAMPLES

A test cell, used in Tests #1-#10, was designed having a flow path wherein the water first flowed through a pack of stainless steel wool in order to ensure flow diffusion, then the water passed into and through a screen, and then into a gravel pack of varying composition (as set forth below).

A second screen was placed at the end of the gravel pack to hold the gravel in place. Table 2 below shows the amount of gravel (20/40 sand) used to pack the cell, the amount of tackifying agent coated onto the sand in percent by weight of sand, and the amount of degradable fines attached to the gravel (sand) as a percentage by weight of the gravel. For each test, the gravel used was 20/40 sand, the tackifying agent was SANDWEDGE® (a tackifier, commercially available from Halliburton Energy Services, Inc.), and the degradable fines were BIOVERT® H150 (cryogenically ground polylactic acid having a 150 micron median diameter, available from Halliburton Energy Services, Inc.). The tests were run at room temperature. The pressure experiences inside the cell were recorded for each test.

| Test | Pounds of Gravel | Tackifying Agent (as % of sand weight) | Degradable Fines (as % of sand weight) | Pressure Increase(psi/sec) |
|---|---|---|---|---|
| 1 | 0.33 | 0.75 | 0 | 0.0 |
| 2 | 0.33 | 0.75 | 1 | 0.02 |
| 3 | 0.34 | 0.67 | 2 | 0.60 |
| 4 | 0.34 | 0.67 | 3 | 0.12 |
| 5 | 0.32 | 0.40 | 3 | 0.12 |
| 6 | 0.32 | 0.27 | 3 | 0.36 |
| 7 | 0.33 | 0.27 | 4 | 0.12 |
| 8 | 0.34 | 0.27 | 3 | 0.09 |
| 9 | 0.34 | 0.20 | 3 | 0.23 |
| 10 | 0.34 | 1.00 | 8.3 | 1.55 |

Test #1. A control was run using a cell packed with 150 g of sand that was coated with 0.75% SANDWEDGE® by weight of the sand. FIG. 1 shows that, as expected, no pressure increase was seen at 1 gallon per minute ("gpm") flow rate.

Each of the following Tests (#2-#10) were all run first at 40 mL/min (approximately 1/100th of 1 gallon/minute) to determine that no change in pressure occurred at that relatively low rate before the flow rate was increased. For each test (#2-#10) the pressure trace remained flat at the lower rate.

Figure 2:
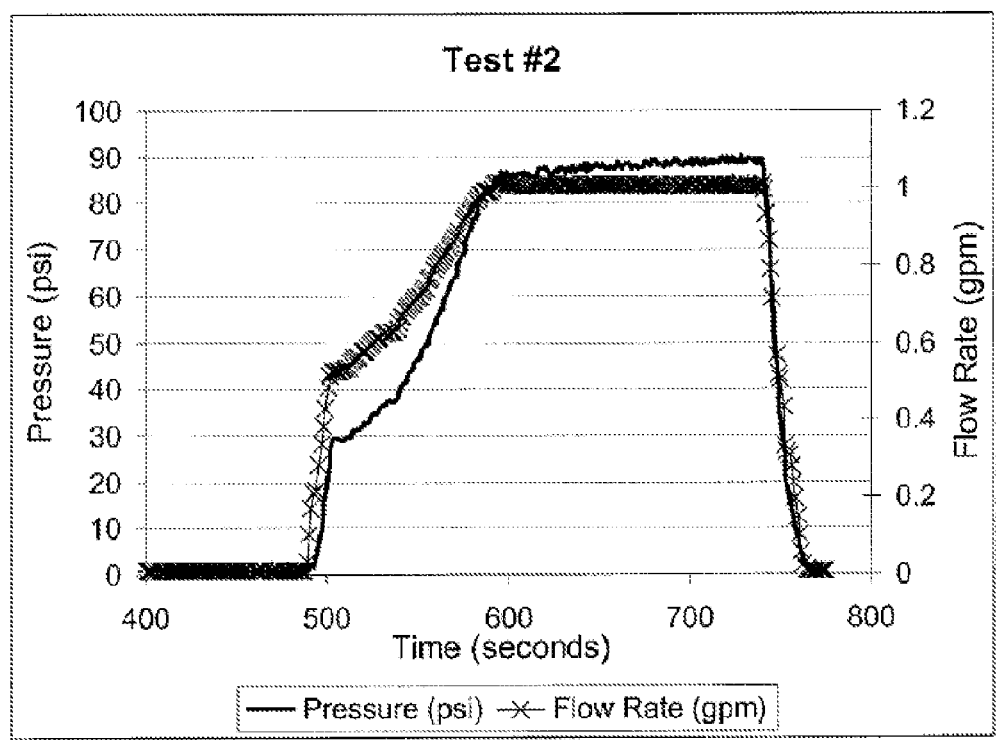
FIG. 2 shows the results of Test #2, sand coated with 0.75% tackifying agent and 1% degradable material.

Test #2. The cell was packed with 150 g of sand that was coated with 0.75% SANDWEDGE® by weight of the sand and with 1% polylactic acid by weight of the sand. At 1 gal/min, no significant pressure increase was seen, as shown in FIG. 2.

Figure 3:
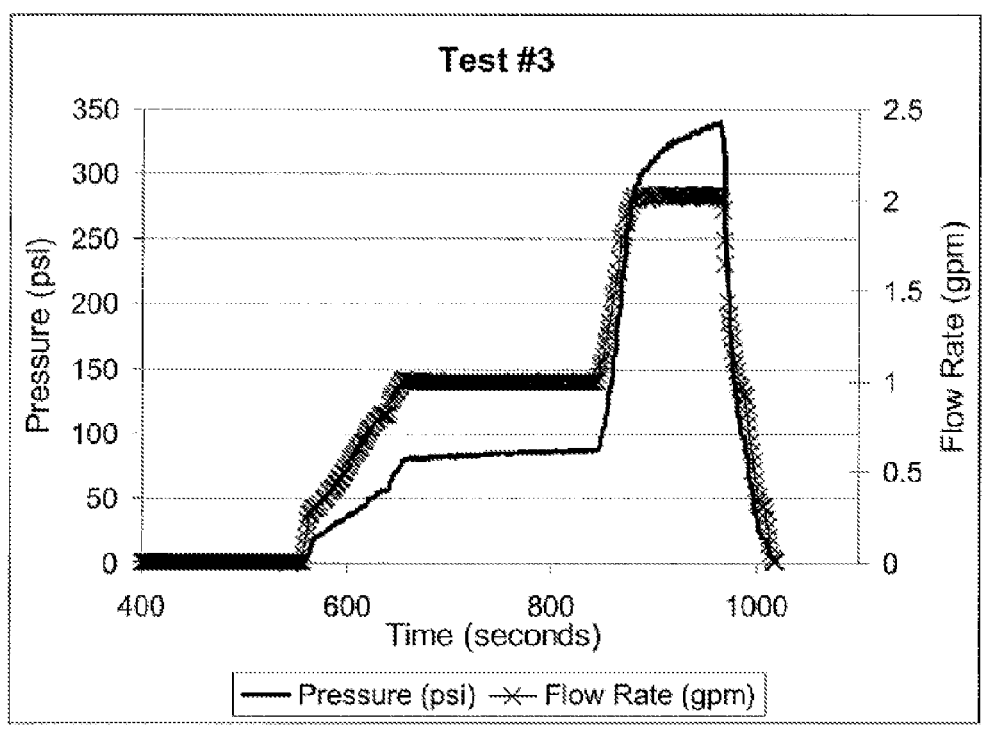
FIG. 3 shows the results of Test #3, sand coated with 0.67% tackifying agent and 2% degradable material.

Test #3. The cell was packed with 150 g of sand that was coated with 0.67% SANDWEDGE® and with 2% polylactic acid. At 1 gal/min, no pressure increase was seen. The rate was then increased to 2 gal/min and a ramp in pressure of about 0.6 psi/sec was seen, as shown in FIG. 3, indicating that the degradable fines were acting to plug the interstitial spaces.

Figure 4:
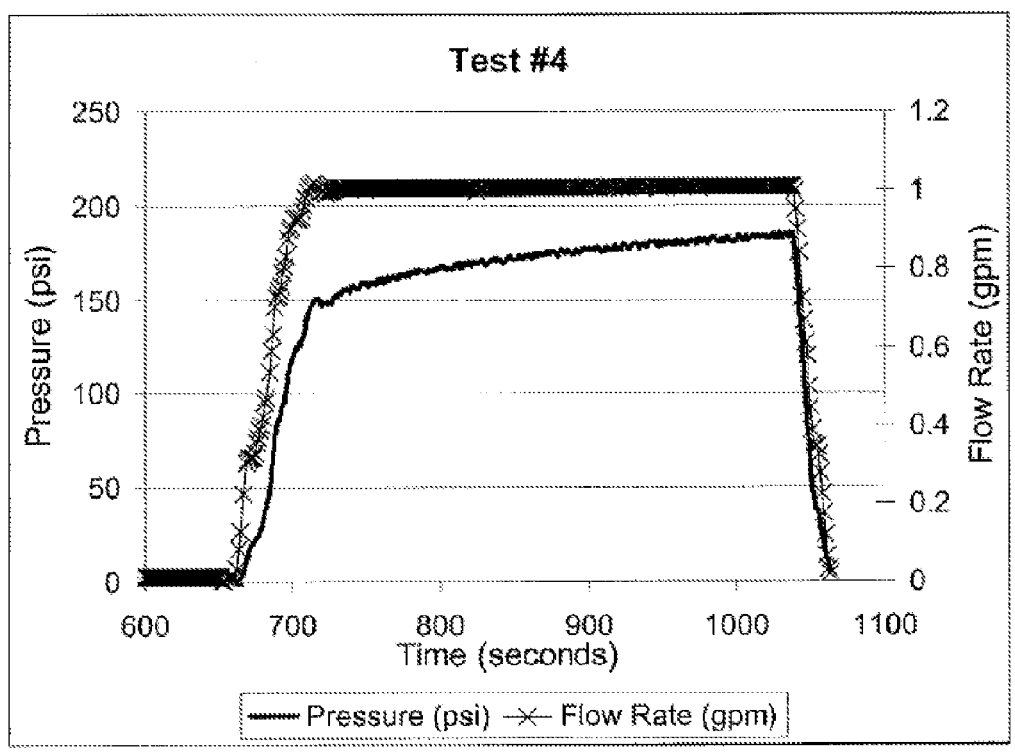
FIG. 4 shows the results of Test #4, sand coated with 0.67% tackifying agent and 3% degradable material.

Test #4: The cell was packed with 150 g of sand that was coated with 0.67% SANDWEDGE® and with 3% polylactic acid. At 1 gal/min, a ramp in pressure of about 0.12 psi/sec was seen, indicating the plugging due to the degradable fines at this combination of rate and tackifying agent, as seen in FIG. 4.

Figure 5:
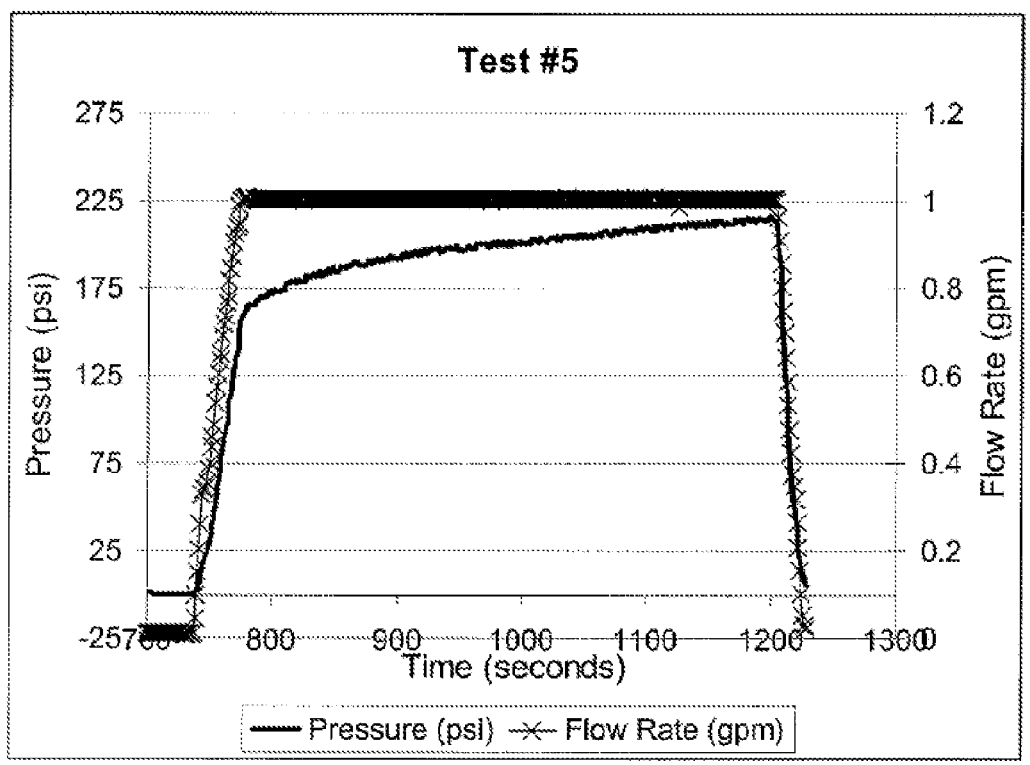
FIG. 5 shows the results of Test #5, sand coated with 0.4% tackifying agent and 3% degradable material.

Test #5: The cell was packed with 150 g of sand that was coated with 0.4% SANDWEDGE® and with 3% polylactic acid. At 1 gal/min, a ramp in pressure of about 0.12 psi/sec was seen, as shown in FIG. 5.

Figure 6:
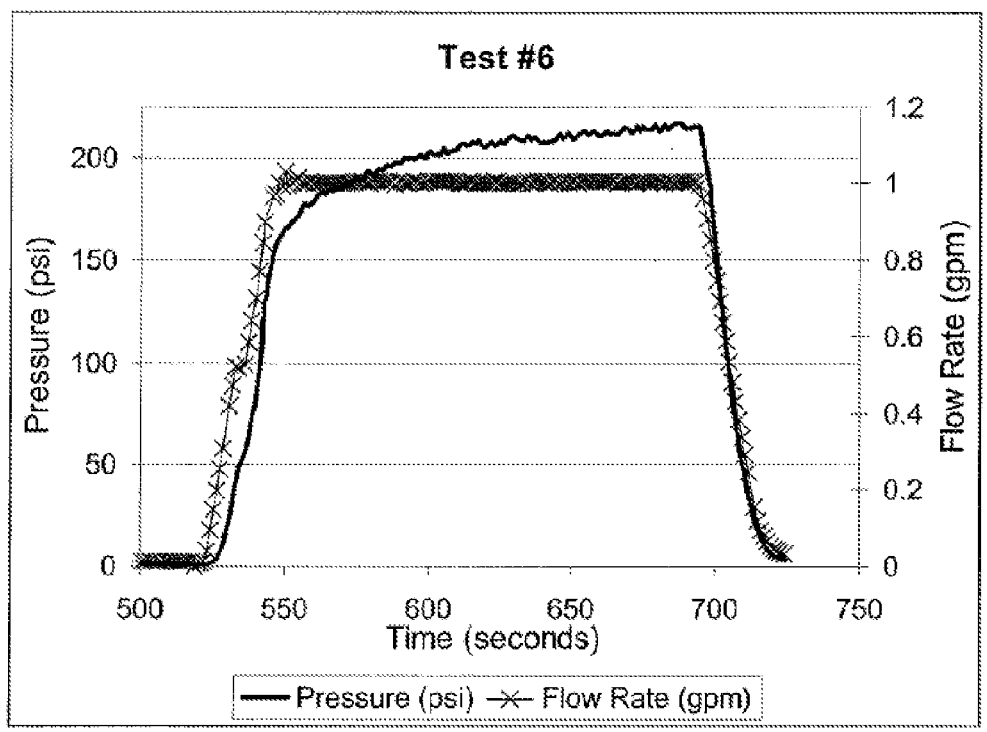
FIG. 6 shows the results of Test #6, sand coated with 0.27% tackifying agent and 3% degradable material.

Test #6: The cell was packed with 150 g of sand that was coated with 0.27% SANDWEDGE® and with 3% polylactic acid. At 1 gal/min, a ramp in pressure of about 0.36 psi/sec was seen, as shown in FIG. 6.

Figure 7:
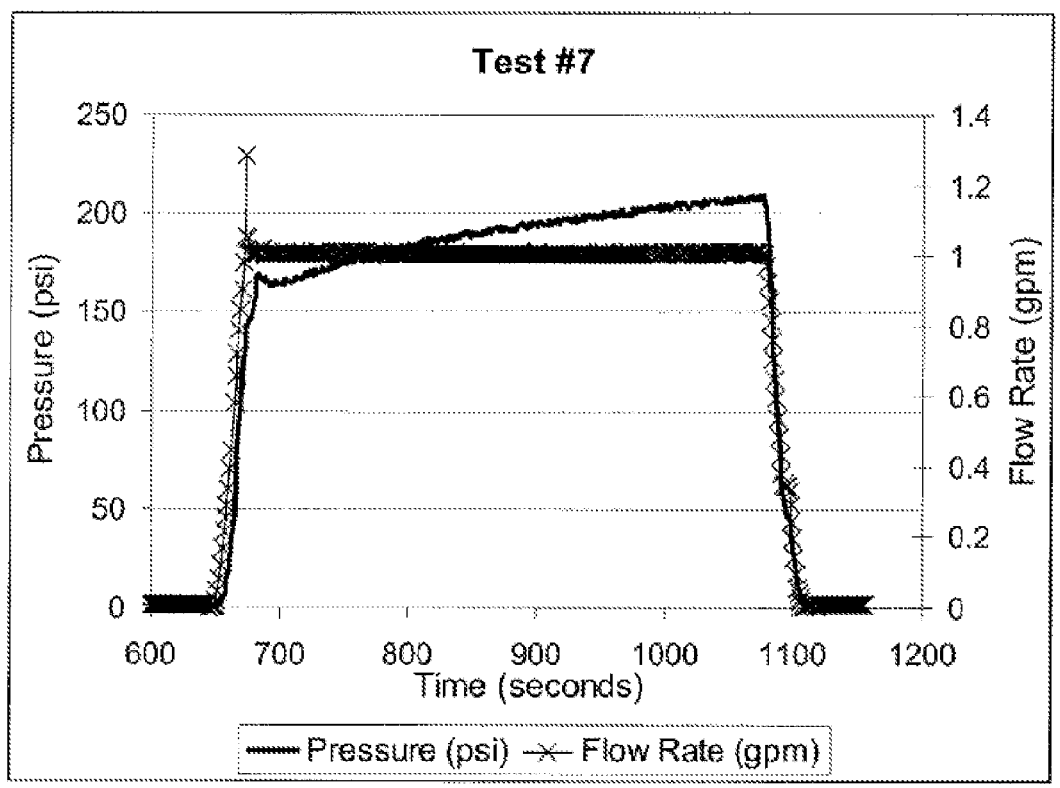
FIG. 7 shows the results of Test #7, sand coated with 0.27% tackifying agent and 4% degradable material.

Test #7: The cell was packed with 150 g of sand that was coated with 0.27% SANDWEDGE® and with 4% polylactic acid. At 1 gal/min, a ramp in pressure of about 0.12 psi/sec was seen, as shown in FIG. 7. From this point forward the cell was modified with a pressure port just above the bottom screen in case of suspected plugging of the bottom screen in the cell which might cloud the data.

Figure 8:
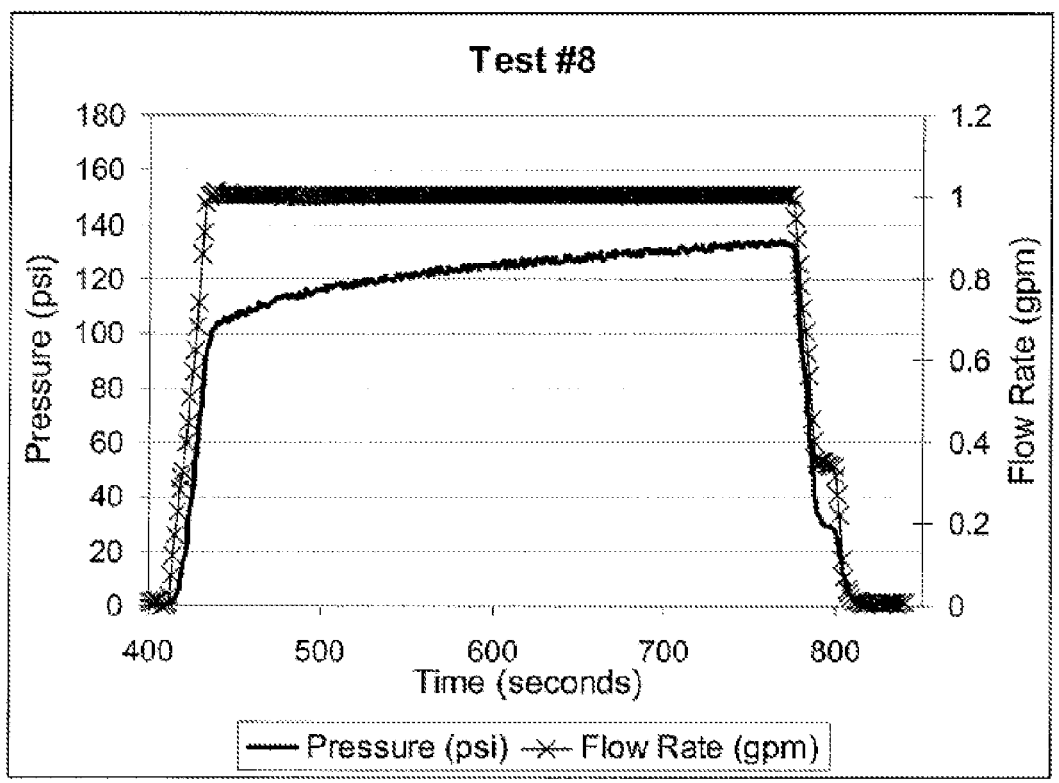
FIG. 8 shows the results of Test #8, sand coated with 0.27% tackifying agent and 3% degradable material.

Test #8: Test #8 was a repeat of Test #6 following the modification of the test cell. The cell was packed with 150 g of sand that was coated with 0.27% SANDWEDGE® and with 3% polylactic acid. At 1 gal/min, a ramp in pressure of about 0.09 psi/sec was seen, as shown in FIG. 8.

Figure 9:
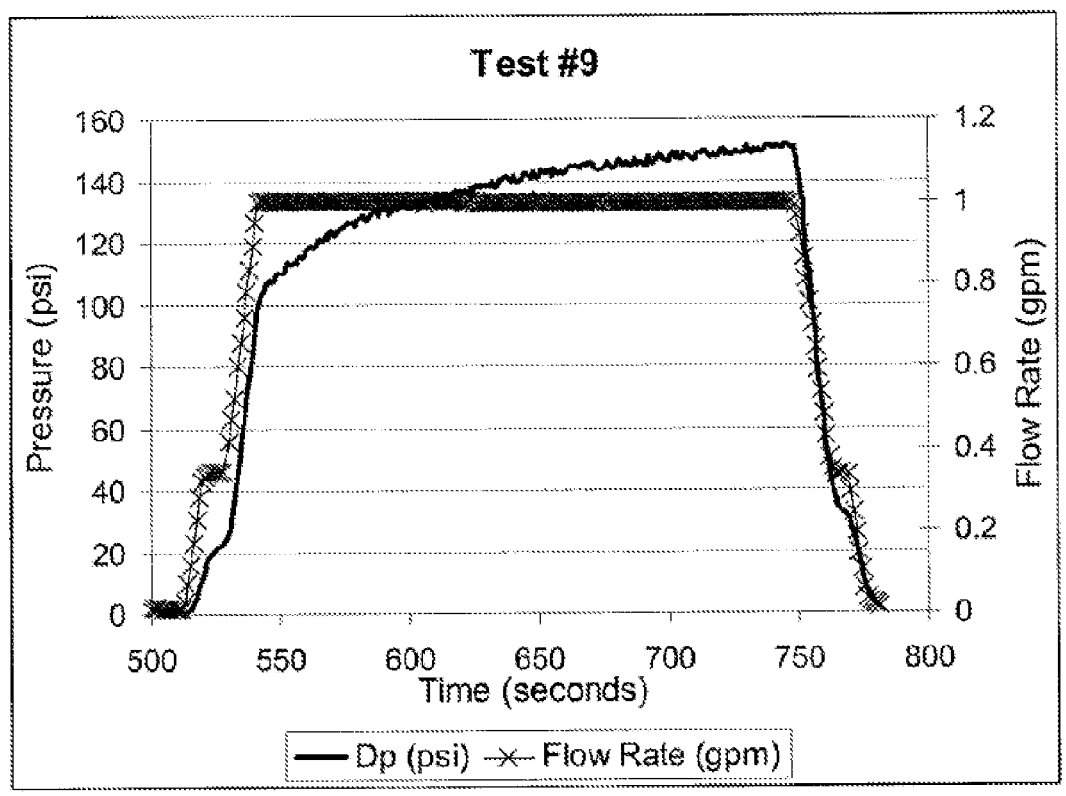
FIG. 9 shows the results of Test #9, sand coated with 0.2% tackifying agent and 3% degradable material.

Test #9: The cell was packed with 150 g of sand that was coated with 0.2% SANDWEDGE® and with 3% polylactic acid. At 1 gal/min, a ramp in pressure of about 0.23 psi/sec was seen, as shown in FIG. 9.

Figure 10:
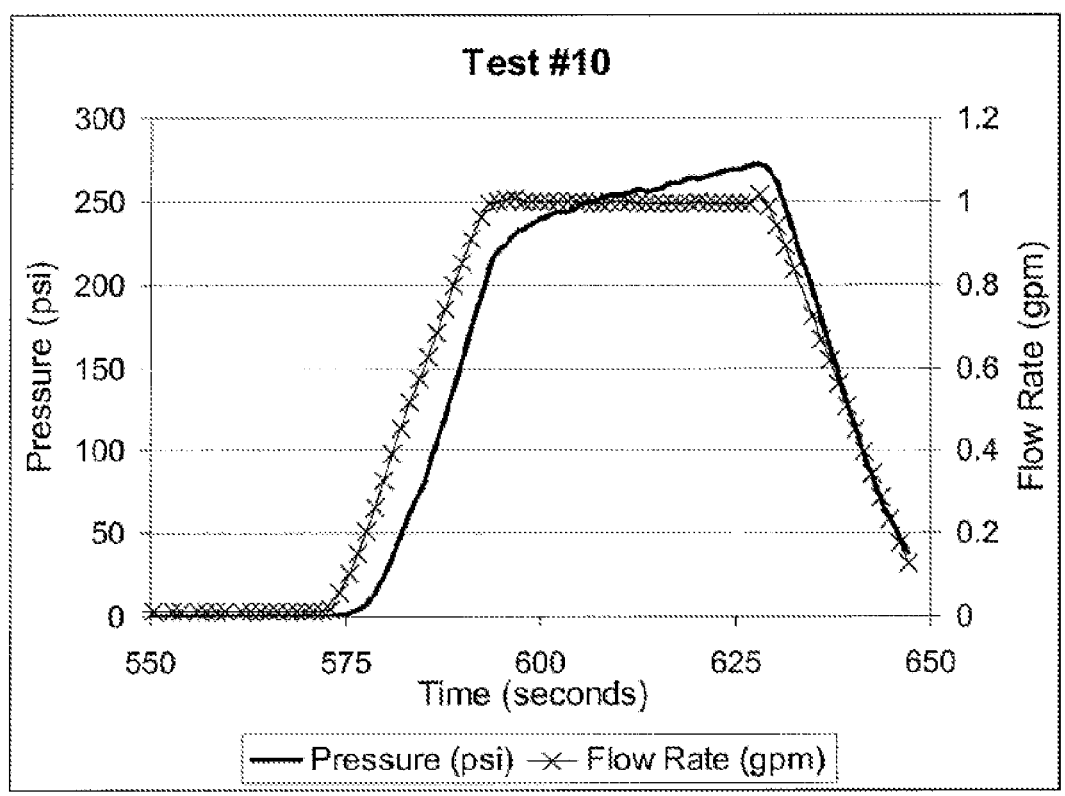
FIG. 10 shows the results of Test #10, sand coated with 1% tackifying agent and 8.3% degradable material.

Test #10: The cell was packed with 150 g of sand that was coated with 1% SANDWEDGE® and with 8.3% polylactic acid (an amount found to mostly detackify the SANDWEDGE®). As noted above, the pressure remained steady during the lower rate (40 mL/min or 0.01 gal/min) while, as seen in FIG. 10, at 1 gal/min, a ramp in pressure of about 1.55 psi/sec was seen.

A test cell of 1 inch inner diameter, used in Tests #11-#14, was designed having a flow path wherein the water first flowed into and through a screen, then into a particulate pack of varying composition (as set forth below), and finally through a final screen. The cell was used in a system having in series a tap water source, a filter, a heating bath, a pressure gauge, a flow meter, the cell, and a collection vessel. The test procedure was to pack 150 grams of sample into the cell and tap down with a packing rod. Once the cell with sample was connected to the system, preheated tap water was flowed through the cell at rates of 1.3 gal/min, 1.5 gal/min, and 1.7 gal/min in a step-wise fashion. As compression of the sand back occurred, the pump speed was adjusted to maintain a constant flow rate. The pressure, flow rate, bath temperature (i.e., preheated tap water temperature), and temperature at the cell were recorded.

Samples tested in Tests #11-#14 were 20/40 sand coated with amorphous or plasticized poly(lactic acid) (PLA) compositions. The plasticized PLA composition (with 15 parts per hundred ("PHR") tributyl citrate) was prepared by blending 45 grams of amorphous PLA and 6.75 grams tributyl citrate in a Brabender twin-screw mixer preheated to 135° C. The melt was blended for 2 min at a rotor speed of 100 rpm.

The glass transition temperature of the amorphous and 15% plasticized PLA samples were examined by differential scanning calorimetry using a Q200 from TA Instruments. The scans were carried out in hermatic pans, under a $N_2$ atmosphere on approximately 10 mg of material. The scans were heated from −50° C. to 200° C. at 10° C./min ramp rate, cooled back down to −50° C. at a cooling rate of 5° C./min, and then heated to 200° C. at a ramp rate of 10° C./min. The glass transition temperature for each sample was measured based on the first heating cycle. The glass transition temperature for amorphous PLA and plasticized PLA was measured to be 64° C. and 33° C., respectively.

The particulates were coated with 15% by weight of either amorphous PLA or plasticized PLA. First, 400 grams of 20/40 sand was heated to 280° C. for 30 min. Then, 60 grams of amorphous PLA or plasticized PLA were added to the heated sand followed by vigorous stirring. After the sand and polymer were well mixed, cold water was added to the sand container with vigorous stirring. The resultant coated particulates were filtered through a funnel and dried in air.

Figure 12:
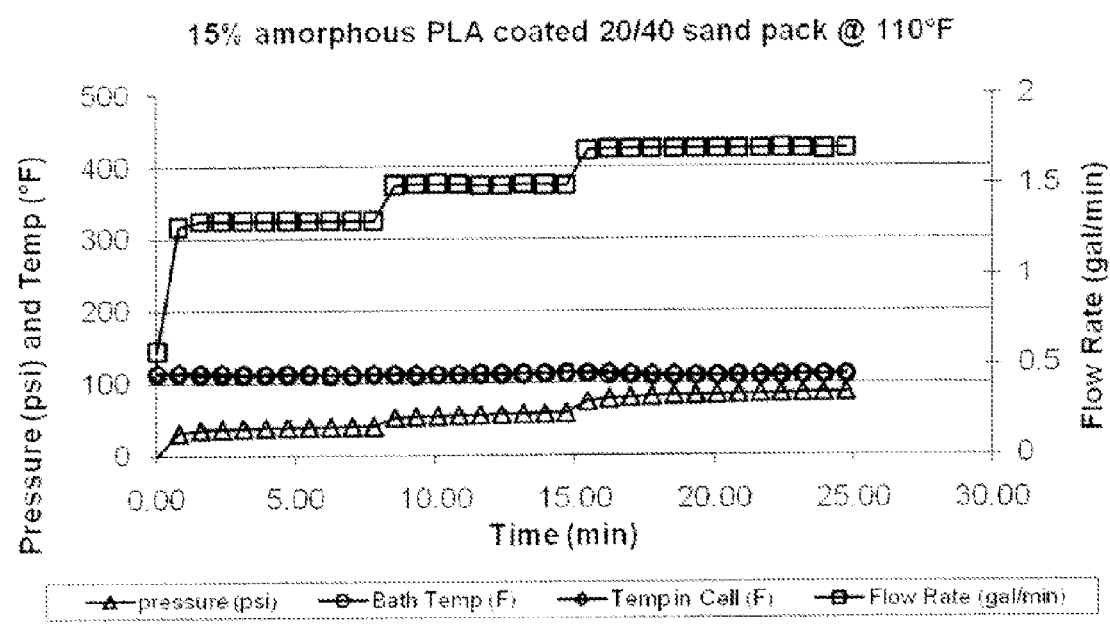
FIG. 12 shows the results of Test #11, sand coated with 15% unplasticized polymer tested at 110° F.

Test #11: The sample tested was 20/40 sand coated with 15% amorphous poly(lactic acid) with a tap water temperature of 110° F. As shown in FIG. 12, a slight pressure increase was observed as the test procedure was run through the three flow rates.

Figure 13:
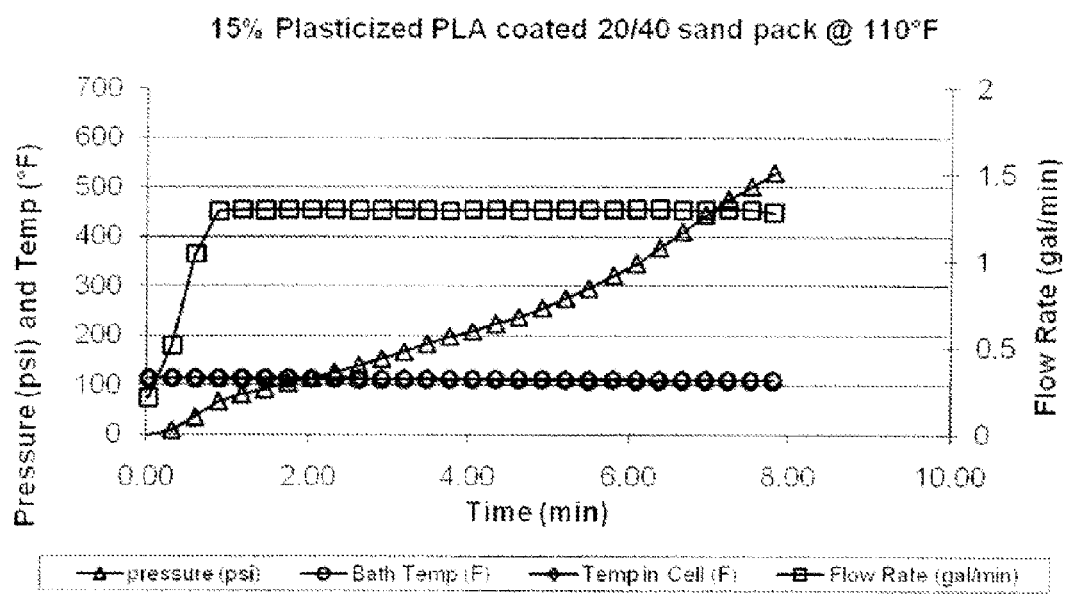
FIG. 13 shows the results of Test #12, sand coated with 15% plasticized polymer tested at 110° F.

Test #12: The sample tested was 20/40 sand coated with 15% plasticized poly(lactic acid) with a tap water temperature of 110° F. As shown in FIG. 13, at a flow rate of 1.3 gal/min a dramatic pressure increase was observed. Within 8 min, the pressure reached 520 psi indicating the particle pack was plugged. Without being bound by theory or mechanism, it is believed that at 110° F. (43° C.) the tap water is at a higher temperature than the glass transition temperature of the plasticized polymer (91° F., 33° C.). Therefore, the plasticized polymer coating softened, deformed, and filled the interstitial spaces in the particulate pack.

Figure 14:
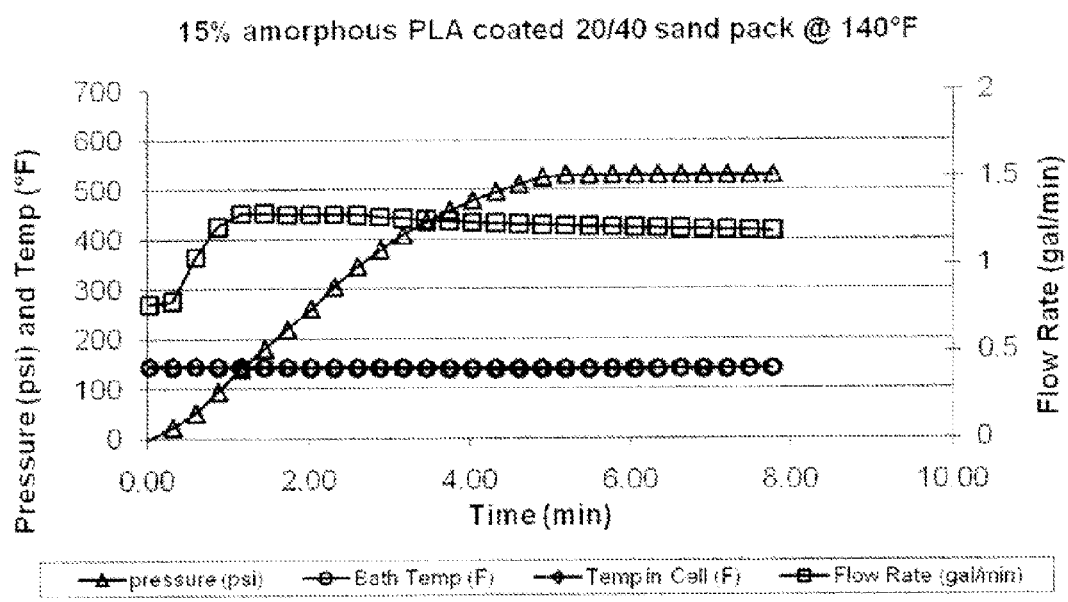
FIG. 14 shows the results of Test #13, sand coated with 15% unplasticized polymer tested at 140° F.

Test #13: The sample tested was 20/40 sand coated with 15% amorphous poly(lactic acid) with a tap water temperature of 140° F. As shown in FIG. 14, at a flow rate of 1.3 gal/min a dramatic pressure increase was observed. Within 5 min, the pressure reached 520 psi indicating the particle pack was plugged.

Figure 15:
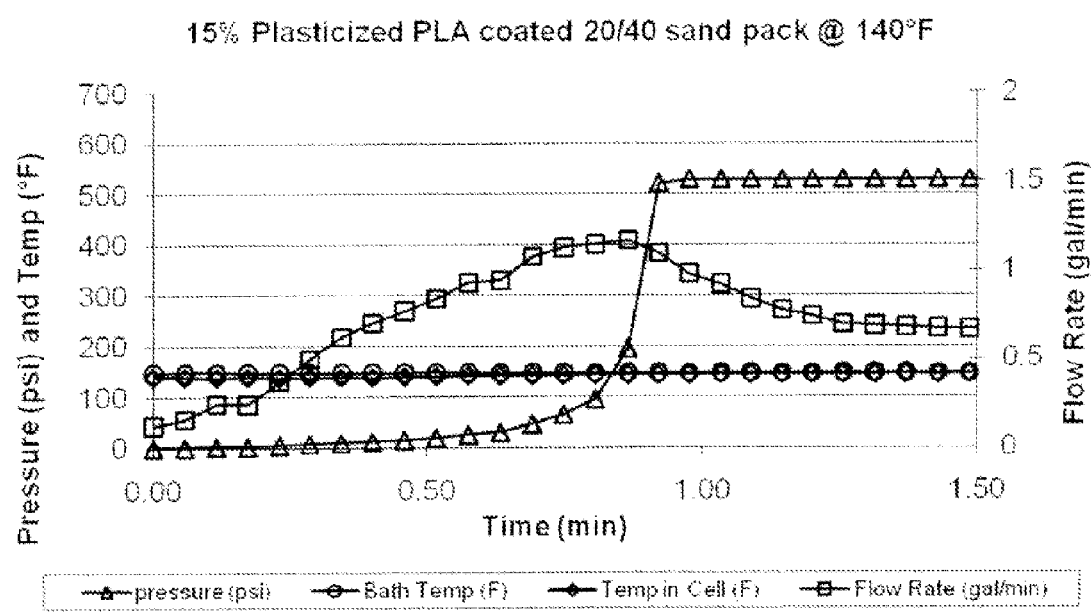
FIG. 15 shows the results of Test #14, sand coated with 15% plasticized polymer tested at 140° F.

Test #14: The sample tested was 20/40 sand coated with 15% plasticized poly(lactic acid) with a tap water temperature of 140° F. As shown in FIG. 15, at a flow rate of 1.0 gal/min a dramatic pressure increase was observed. It should be noted that a flow rate of 1.3 gal/min was unable to be achieved due to rapid plugging. Within 1 min, the pressure reached 520 psi indicating the particle pack was plugged.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a wellbore extending into a subterranean formation, wherein a perforation tunnel provides a fluid connection between the wellbore and the subterranean formation;
   providing a diverting particulate that comprises a degradable plasticized polymer coating on a particulate;
   placing the diverting particulate into the perforation tunnel, wherein the step of placing the diverting particulate forms a particulate pack within the subterranean formation and the perforation tunnel;
   allowing the degradable plasticized polymer coating to deform and fill the interstitial spaces within the particulate pack in the perforation tunnel such that the fluid conductivity between the wellbore and the subterranean formation is substantially blocked; and
   allowing the plasticized polymer coating to degrade over time thereby substantially restoring the fluid conductivity between the wellbore and the subterranean formation.

2. The method of claim 1, wherein the diverting particulate is placed in the subterranean formation using a low-viscosity carrier fluid.

3. The method of claim 1, wherein the degradable plasticized polymer coating has a thickness of about 0.5 microns to about 50 microns.

4. The method of claim 1, wherein the degradable plasticized polymer coating comprises a degradable polymer and a plasticizer, and wherein the plasticizer comprises at least one selected from the group consisting of a polyol, glycerol, propylene glycol, polyethylene glycol (PEG), diacetyl monoacyl glycerol, polypropylene glycol, polyethylene oxide, oligomeric lactic acid, an organic ester, a citrate ester, tributyl citrate, triethyl citrate, acetyltributyl citrate, acetyltriethyl citrate, trioctyl citrate, acetyl trioctyl citrate, trihexyl citrate, acetyl trihexyl citrate, trimethyl citrate, 1,2-cyclohexane dicarboxylic acid diisononyl ester, alkyl sulfonic acid phenyl ester, a glucose monoester, a partially fatty acid ester, PEG monolaurate, an acetic ester, triacetin, poly(ε-caprolactone), poly(hydroxybutyrate), glycerin-1-benzoate-2,3-dilaurate, glycerin-2-benzoate-1,3-dilaurate, ethylphthalylethyl glycolate, glycerine diacetate monocaprylate, poly(propylene glycol) dibenzoate, dipropylene glycol dibenzoate, ethyl phthalyl ethyl glycolate, poly(ethylene adipate) disterate, an adipate-based plasticizer, di-iso-butyl adipate, bis(butyl diethylene glycol) adipate, any derivative thereof, and any combination thereof.

5. The method of claim 1, wherein the degradable plasticized polymer coating comprises a degradable polymer and a plasticizer, wherein the plasticizer is at about 0.1% to about 30% by weight of the polymer.

6. The method of claim 1, wherein the glass transition temperature of the degradable plasticized polymer ranges from about 5° C. to about 50° C.

7. The method of claim 1, wherein the degradable plasticized polymer coating further comprises a tackifying agent.

8. The method of claim 1, wherein the degradable plasticized polymer coating further comprises a dehydrated compound.

9. The method of claim 1, wherein the particulate is a proppant particulate.

10. A method comprising:
providing a wellbore extending into a subterranean formation, wherein a perforation tunnel provides a fluid connection between the wellbore and the subterranean formation;
mixing a diverting particulate in a low-viscosity carrier fluid, wherein the diverting particulate comprises a degradable plasticized polymer coating on a particulate;
introducing the diverting particulate and the low-viscosity carrier fluid into the wellbore via a high rate water pack operation;
forming a particulate pack within the perforation tunnel;
passing the low-viscosity carrier fluid through the particulate pack at a high rate thereby causing at least a portion of the degradable plasticized polymer coating to deform and fill the interstitial spaces within the particulate pack in the perforation tunnel such that the fluid connection between the wellbore and the subterranean formation is substantially blocked; and
allowing the plasticized polymer coating to degrade over time thereby opening the interstitial spaces within the particulate pack to substantially restore the fluid connection between the wellbore and the subterranean formation.

11. The method of claim 10, wherein the low viscosity carrier fluid is an aqueous-based fluid with a viscosity of less than about 20 cp.

12. The method of claim 10, wherein the degradable plasticized polymer coating has a thickness of about 0.5 microns to about 50 microns.

13. The method of claim 10, wherein the rate of the low-viscosity carrier fluid passing through the particulate pack ranges from about 0.5 gal/min to about 5 gal/min.

14. The method of claim 10, wherein the degradable plasticized polymer coating comprises a degradable polymer and a plasticizer, wherein the plasticizer is at about 0.1% to about 30% by weight of the polymer.

15. The method of claim 10, wherein the glass transition temperature of the degradable plasticized polymer ranges from about 5° C. to about 50° C.

16. The method of claim 10, wherein the particulate is a proppant particulate.

17. The method of claim 10, wherein the low-viscosity carrier fluid comprises an additive selected from the group consisting of a salt; a weighting agent; an inert solid; a fluid loss control agent; an emulsifier; a dispersion aid; a corrosion inhibitor; an emulsion thinner; an emulsion thickener; a viscosifying agent; a high-pressure, high-temperature emulsifier-filtration control agent; a surfactant; a second particulate; a proppant; a lost circulation material; a foaming agent; a gas; a pH control additive; a breaker; a biocide; a crosslinker; a stabilizer; a chelating agent; a scale inhibitor; a mutual solvent; an oxidizer; a reducer; a friction reducer; a clay stabilizing agent; and any combination thereof.

18. A method comprising:
providing a wellbore extending into a subterranean formation, wherein a perforation tunnel provides a fluid connection between the wellbore and the subterranean formation;
providing a diverting particulate in a low-viscosity carrier fluid, wherein the diverting particulate comprises a degradable plasticized polymer coating on a particulate;
forming a particulate pack within the perforation tunnel;
allowing the degradable plasticized polymer coating to deform and fill the interstitial spaces within the particulate pack in the perforation tunnel such that a differential pressure of at least about 500 psi can be maintained across the perforation tunnel; and
allowing the plasticized polymer coating to degrade over time thereby opening the interstitial spaces within the particulate pack.

19. The method of claim 18, wherein the differential pressure can be maintained across the perforation tunnel for at least about 2 hours.

20. The method of claim 18, wherein after at least a portion of the plasticized polymer has degraded, the differential pressure that can be maintained across the perforation tunnel is less than about 100 psi.

* * * * *